Jan. 10, 1956 P. M. HORTON ET AL 2,729,858
APPARATUS FOR PROCESSING FIBROUS VEGETABLE MATERIALS
Filed July 6, 1949 2 Sheets-Sheet 1
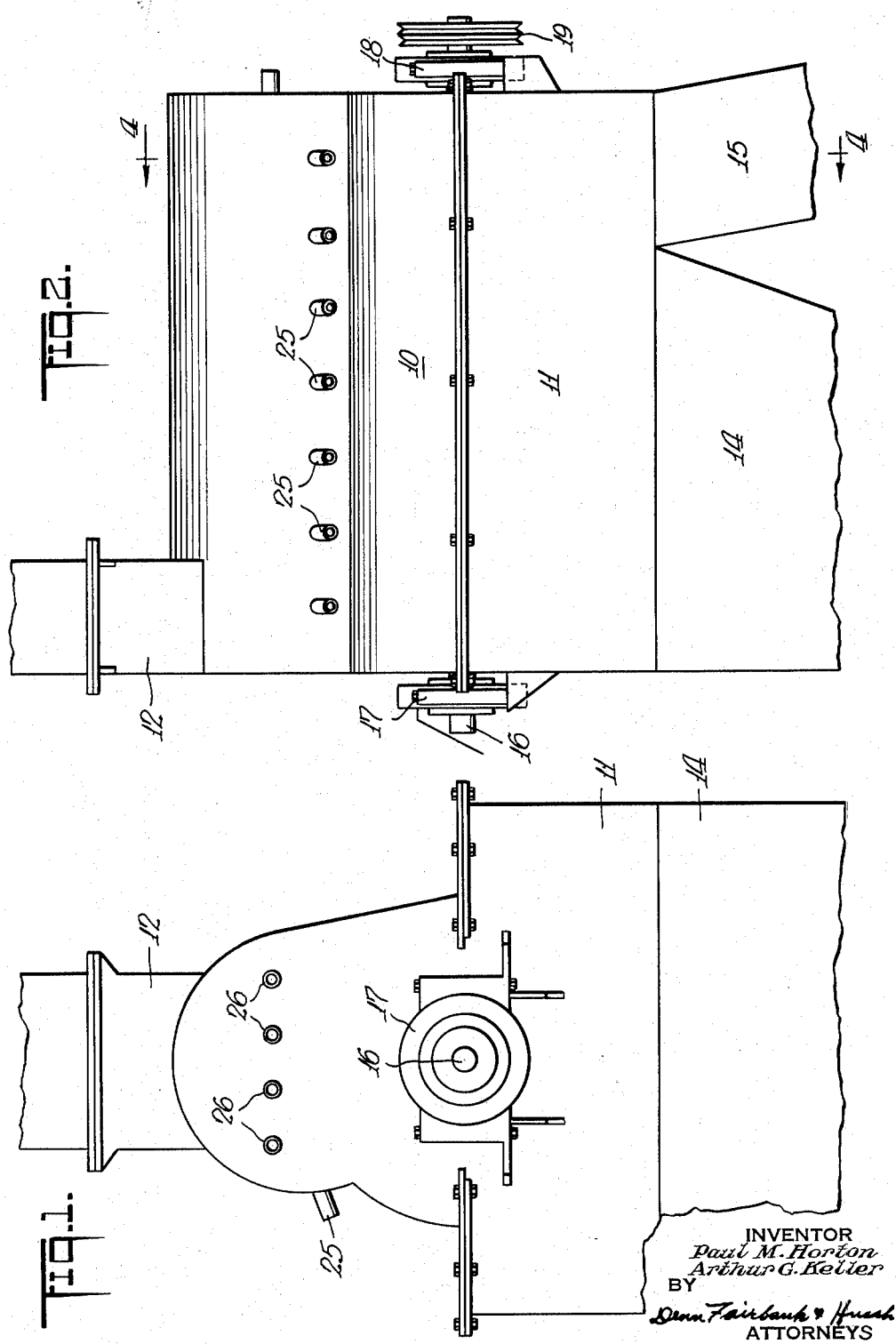
INVENTOR
Paul M. Horton
Arthur G. Keller
BY
Denn Fairbank & Hursh
ATTORNEYS

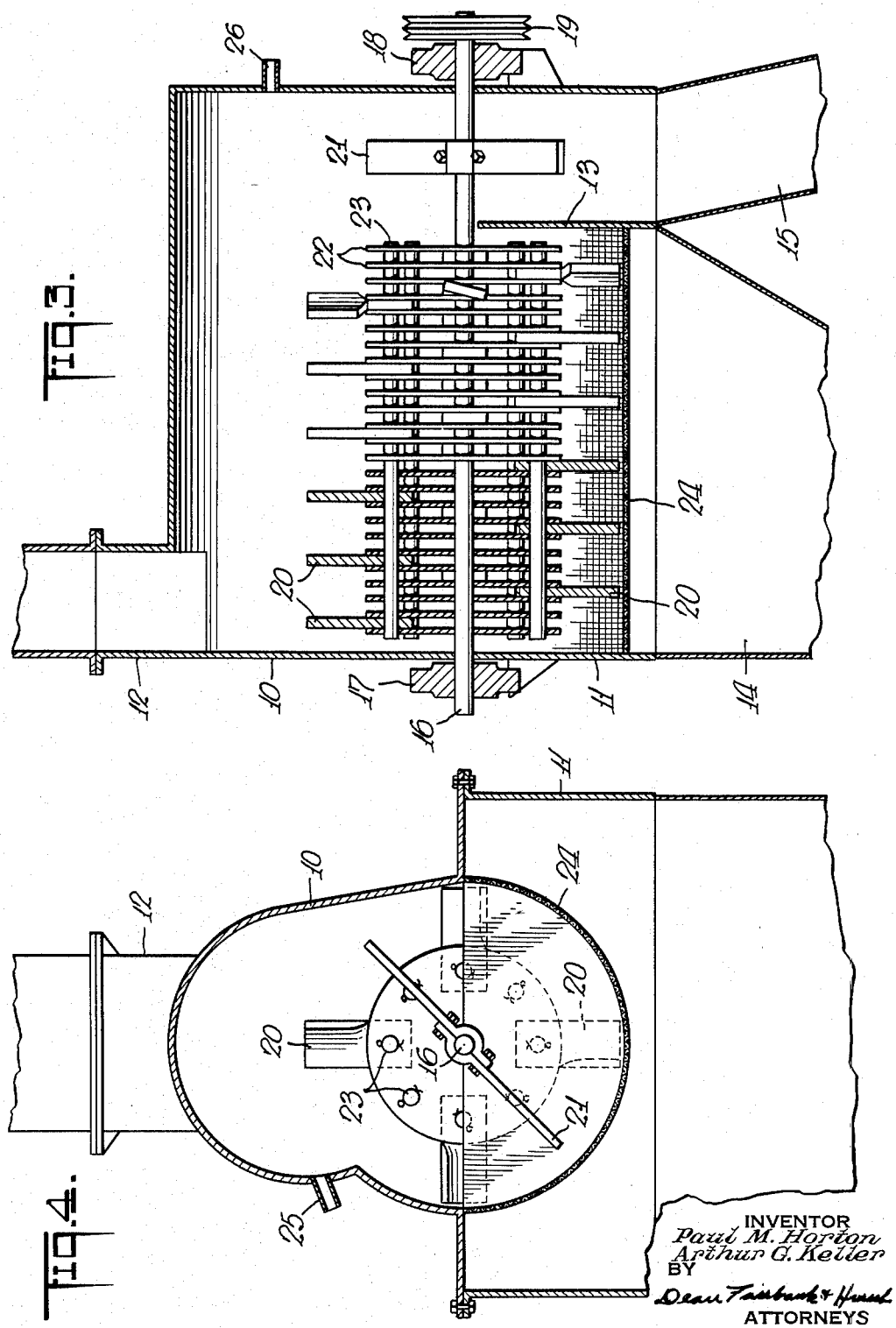

United States Patent Office 2,729,858
Patented Jan. 10, 1956

2,729,858
APPARATUS FOR PROCESSING FIBROUS VEGETABLE MATERIALS

Paul M. Horton and Arthur G. Keller, Baton Rouge, La., assignors to Board of Supervisors of Louisiana State University and Agricultural and Mechanical College, Baton Rouge, La.

Application July 6, 1949, Serial No. 103,268

9 Claims. (Cl. 19—90)

This invention relates to mills or apparatus for processing fibrous vegetable materials so as to separate them into two portions, one of which is substantially pith-free fiber and the other of which contains a major portion of the original pith. The fibrous vegetable materials which may be treated include sugar cane bagasse, sorgho bagasse, bamboo, reed canes, maize stalks, and similar products or by-products.

The fibers of such materials are suitable for the production of pulp for use in paper or alpha-cellulose production, or other purposes, but their commercial use in such fields has been handicapped by the presence of varying amounts of pith and other non-fibrous material which is intimately admixed with the fibers, and which has little or no value in such pulps. Its separation from the fibers by presently known methods is too costly to be practical.

One of the objects of the present invention is to provide a machine or mill in which the separation of pith and fiber can be accomplished simply, continuously, and economically.

Another object of our invention is to produce from fibrous vegetable materials of the type above referred to a substantially pith-free fiber fraction suitable for use in the preparation of cellulose pulps.

Another object of our invention is to produce from fibrous vegetable materials of the type referred to a fraction containing the major portion of the original pith suitable for use in animal feeds, in animal litter, in agricultural mulches, as an absorbent in explosives manufacture, and for other purposes.

Other objects and advantages of our invention will become apparent in connection with the following description and a consideration of the construction shown in the accompanying drawings, which is merely one of many embodiments of our invention. In these drawings:

Fig. 1 is an end view of an apparatus embodying our invention.

Fig. 2 is a side elevation.

Fig. 3 is a vertical central longitudinal section, and

Fig. 4 is a vertical transverse section on the line 4—4 of Fig. 2.

In the apparatus illustrated there is provided a casing which may include an upper section 10 and a lower section 11 which may be detachably secured together. The fibrous material to be treated is delivered through an intake pipe or chute 12 at the top and at one end of the upper casing section 10. In the lower casing section there is provided a vertical transverse partition 13 below and upon opposite sides of which are the separate outlets 14 and 15 for the pith and the fiber respectively.

Within the casing, and preferably journaled at the dividing line between the upper and lower sections of the casing, there is mounted a rotor including a longitudinally extending horizontal shaft 16 supported in bearings 17 and 18, and driven in any suitable manner, as for instance by a pulley 19. The rotor also includes a plurality of hammers 20 which are at one side of the partition 13, below the inlet 12 and above the outlet 14, and a beater 21 which is at the other side of the partition 13 and above the outlet 15. The hammers 20 may be secured to the shaft in various different ways. As illustrated, the shaft 16 carries a plurality of circular plates 22 spaced apart axially, and the hammers are interspaced between said plates and held in place by bolts 23 which connect the plates together. The hammers project outwardly beyond the periphery of the plates, and preferably are arranged in a generally spiral path. In other words, with the shaft at rest, each fourth hammer may extend up vertically, the next successive hammers of a series of four would extend horizontally in one direction, the next successive hammers would extend downwardly, and the last hammer of each series would extend horizontally in the other direction. A suitable number of hammers, for instance the last four nearest to the partition 13, may have their outer ends twisted somewhat toward a helical position in respect to the axis of the shaft, so as to act as screw blades or pushers to advance the material above the partition 13 toward the beater 21, whereby it may pass out through the discharge outlet 15.

Beneath the hammers there is provided a substantially semi-cylindrical screen 24 coaxial with the shaft 16 and disposed slightly beyond the path of movement of the outer ends of the hammers. Above the hammers the casing preferably has a portion of the upper section 10 at one or both sides of the shaft bent inwardly, thus to impart to the casing an approximately figure 8 configuration, with the top wall spaced a substantial distance above the path of the hammers. The upper casing section 10, at some distance above the shaft, and preferably approximately at the elevation of the upper side of the path of movement of the hammers, has a plurality of upwardly inclined nozzles 25, and the end wall has a plurality of nozzles 26. All of these nozzles are connected to a source of water supply, whereby jets of water may be projected into the mass of fibrous material above the hammers.

In the operation of the apparatus the fibrous vegetable material is delivered at a suitable rate through the inlet 12 adjacent to one end of the casing, and into this material are projected the jets of water from the nozzles 25 and 26. The shaft may be driven at a relatively high speed, so that the outer ends of the hammers may travel at, for instance, approximately 9,000 feet per minute. The shaft with its hammers and beater is preferably rotated counterclockwise when viewed as in Fig. 4, and the hammers rapidly strike the mass of material into which the water jets are projected, and drag the material around the periphery and along the screen, and project it back up into the mass above the hammers. Due to the inclination of at least some of the hammers, the material is progressively advanced along the chamber from the intake to a position above the partition 13 and the beater 21, and the latter acts to pull the fibers apart and project them down through the outlet 15.

The water which is delivered to the material above the beaters drains down through the disintegrated material and carries with it all or a very substantial part of the pith which is liberated from the fibers by the hammers. Thus, substantially all of the pith will be carried through the screen 24 with the water and out through the outlet 14. The screen is of such mesh that the small particles of pith can readily pass therethrough, whereas the fibers are swept along the screen and eventually delivered beyond the ends of the hammers and into the path of the beater 21.

The action of the machine is to hackle and hammer the material being treated, rather than to rub or grind the fibers free of pith, and the hammers serve to free the fibers from each other, rather than to break them up, and to carry the fibers around and deliver them into the path of streams of water after each revolution. Thus it is possible to obtain the maximum separation with the minimum of power requirements.

Although the hammers may be tightly secured to the plates so that they extend outwardly in a radial direction, it is obvious that they may be rather loosely mounted on the bolts 23, so that the latter act as pivotal supports, and the hammers may swing on the bolts, but tend to assume radial positions due to centrifugal force. The space above the hammers permits the material thrown up by the hammers to become intermixed with the fresh fibrous material being admitted through the inlet 12, and permits such fibers to be washed by the jets of water after each passage around the axis of the shaft 16.

By means of our invention it is possible to remove substantially all of the pith from the fibers, and separate individual fibers without substantial breakage or cutting of them, and therefore the fibrous material discharged through the outlet 15 is suitable for making wall board and other such products having substantial mechanical strength. The progressive movement of the fibers across the body of the beater permits the pith and water to go to the bottom where they are discharged through the screen, and the substantially pith-free fibers are discharged from the end opposite to the inlet for the material to be treated.

Our improved apparatus is inexpensive to manufacture and operate, the power consumption is low, and a substantially complete separation of the pith and the fibers is effected.

Having thus described our invention what we claim as new and desire to secure by Letters Patent is:

1. An apparatus for processing crushed stalks from which juice has been extracted, to separate the pith and fibers, said apparatus including a casing having an inlet in the upper part and at one end for said crushed stalks, a horizontal shaft in said casing and extending lengthwise thereof, beater elements carried by said shaft for breaking up said material and liberating the pith therein, an upright transverse partition below and extending substantially to said shaft and adjacent to but spaced from the other end, a substantially semi-cylindrical screen below said shaft and substantially concentric therewith, and at the side of said partition which is beneath said inlet, means for delivering water to the stalks above said screen to wash pith from the fibers and through said screen, and an outlet at the bottom of the casing adjacent to the end opposite to said inlet, and through which fibers fall after passing over said partition.

2. An apparatus as defined in claim 1, and in which at least some of the beater elements have helically inclined surfaces for advancing the broken stalks lengthwise of the casing.

3. An apparatus as defined in claim 1, and in which the shaft has means above the fiber outlet for agitating the broken pith-free fibers and facilitating the discharge of them through said outlet.

4. An apparatus as defined in claim 1, and in which the water delivering means includes nozzles along a wall of the casing above said beater elements.

5. An apparatus as defined in claim 1, and in which there is means for delivering water to the fibers above the fiber outlet.

6. An apparatus for breaking up crushed stalks of the type having a core of pith in a fibrous shell, to separate the pith from the fibers and separately deliver them, said apparatus including a casing having an inlet for the stalks in the top and adjacent to one end, a transverse, upwardly extending partition in said casing adjacent to the other end, a substantially semi-cylindrical screen at the side of said partition beneath said inlet, a shaft extending lengthwise of said casing, transversely to said partition, closely adjacent to the upper edge of the latter, and substantially concentric with said screen, stalk breaking elements carried by the shaft along the portion of the latter which is directly above said screen, said elements being spaced to a substantial distance below the top of said casing whereby stalks entering said inlet may move lengthwise of the casing above said stalk breaking elements while being broken up by said elements, means for delivering water to the upper part of the casing to wet the stalks being broken by said elements and to wash the pith from the fibers and through said screen, and said casing having an outlet in the bottom and at the end farthest from said inlet, and through which fiber passing over said partition and substantially free of pith, may fall.

7. An apparatus for breaking up crushed stalks containing pith and fibers to effect substantially continuous separation of the pith and fibers, comprising, in combination, a casing having an inlet at its top for the crushed stalks and having spaced in a longitudinal direction from said inlet a fiber discharge outlet at its base, a substantially semi-cylindrical screen extending in a general longitudinal direction having one end contiguous to said inlet below said inlet and having its opposite end contiguous to said fiber discharge outlet, a rotatable shaft extending lengthwise of said casing substantially concentric with said screen, hammers carried by and projecting outwardly from said shaft for breaking up said crushed stalks and liberating the pith therein, the top of the circle defined by the rotation of said hammers being positioned a substantial distance below the top of said casing to provide a relatively large free space directly above said hammers and extending in the same longitudinal direction as the direction of feed of the crushed stalks through said casing in which large free space a mass of the crushed stalks fed to the machine is subjected to repeated beating by said hammers, and a pith discharge passageway beneath said screen through which pith passing through said screen is withdrawn from said casing.

8. An apparatus for breaking up crushed stalks containing pith and fibers to effect substantially continuous separation of the pith and fibers, comprising, in combination, a casing having an inlet at its top for the crushed stalks and having spaced in a longitudinal direction from said inlet a fiber discharge outlet at its base, a substantially semi-cylindrical screen extending in a general longitudinal direction having one end contiguous to said inlet below said inlet and having its opposite end contiguous to said fiber discharge outlet, a rotatable shaft extending lengthwise of said casing substantially concentric with said screen, hammers carried by and extending radially from said shaft for breaking up said crushed stalks and liberating the pith therein, the top of the circle defined by the rotation of said hammers being positioned a substantial distance below the top of said casing to provide a relatively large free space directly above said hammers and extending in the same longitudinal direction as the direction of feed of the crushed stalks through said casing in which large free space a mass of the crushed stalks fed to the machine is subjected to repeated beating by said hammers, the portion of said casing defining said free space having substantially imperforate side walls which merge into the side walls of said semi-cylindrical screen forming substantially smooth and continuous surfaces free of projections on the opposite sides of said rotating hammers, and a pith discharge passageway beneath said screen through which pith passing through said screen is withdrawn from said casing.

9. An apparatus as defined in claim 8, in which at least some of the hammers have helically inclined surfaces for advancing the crushed stalks through said free space lengthwise of the casing and in which the shaft has means above the fiber outlet for facilitating discharge of the fibers through said outlet.

References Cited in the file of this patent

UNITED STATES PATENTS

| 114,400 | Bouchard | May 2, 1871 |
| 1,238,043 | Murray | Aug. 21, 1917 |
| 1,483,034 | Wootton | Feb. 5, 1924 |
| 1,814,670 | Dougan | July 14, 1931 |
| 2,199,137 | Magnani | Apr. 30, 1940 |